May 6, 1924. 1,493,306
J. WILKINSON
QUICK RELEASE VALVE COUPLING
Filed March 17, 1921 2 Sheets-Sheet 1
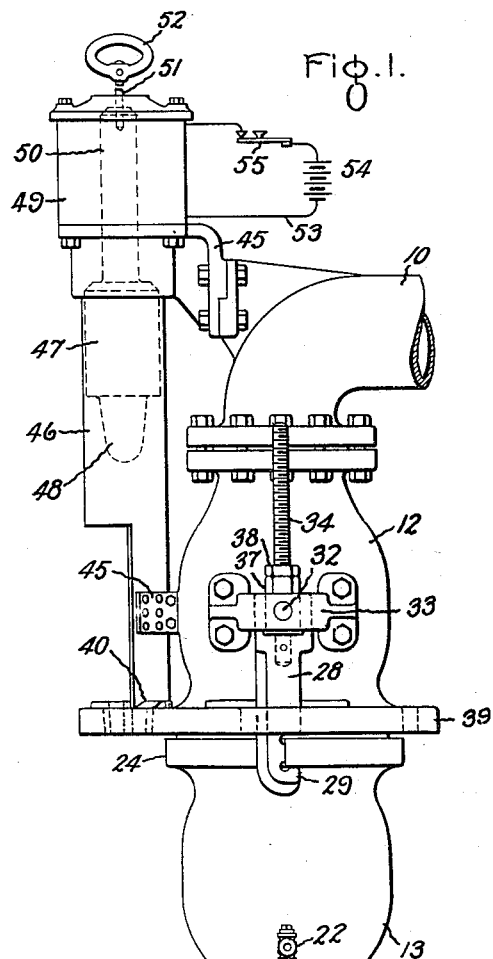
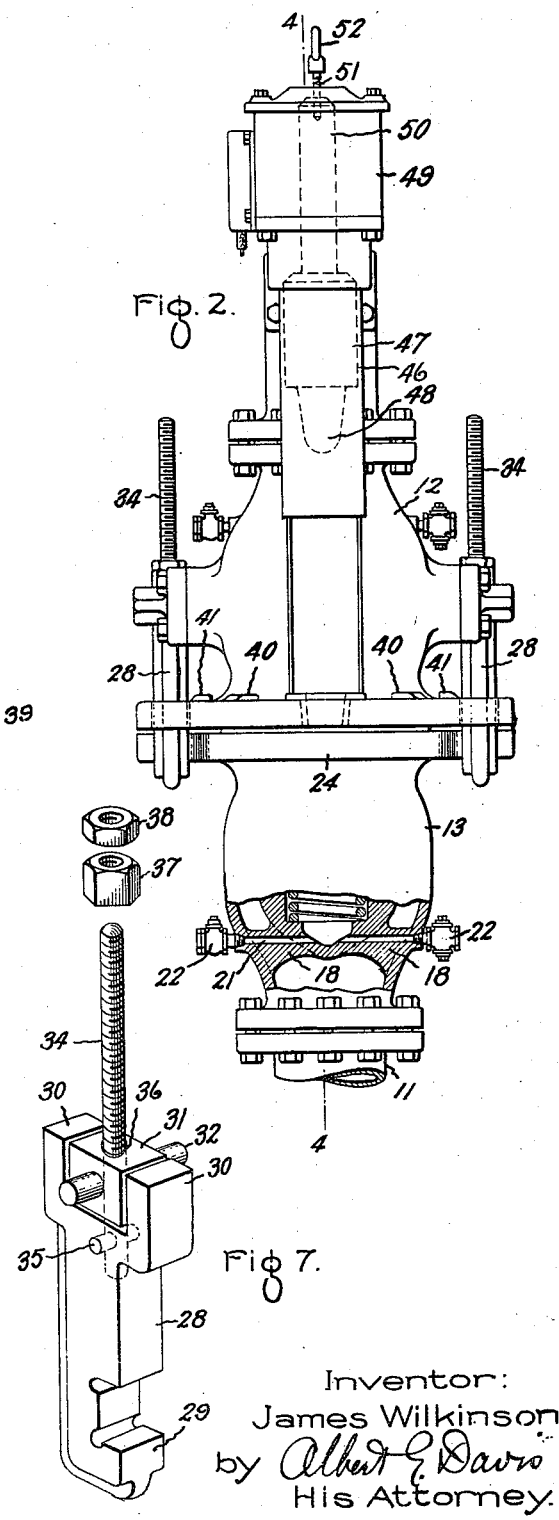
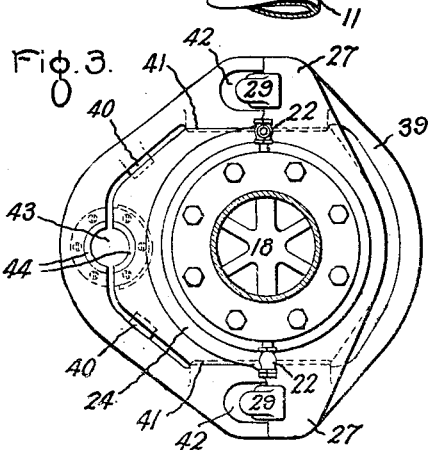
Inventor:
James Wilkinson,
by Albert E. Davis
His Attorney.

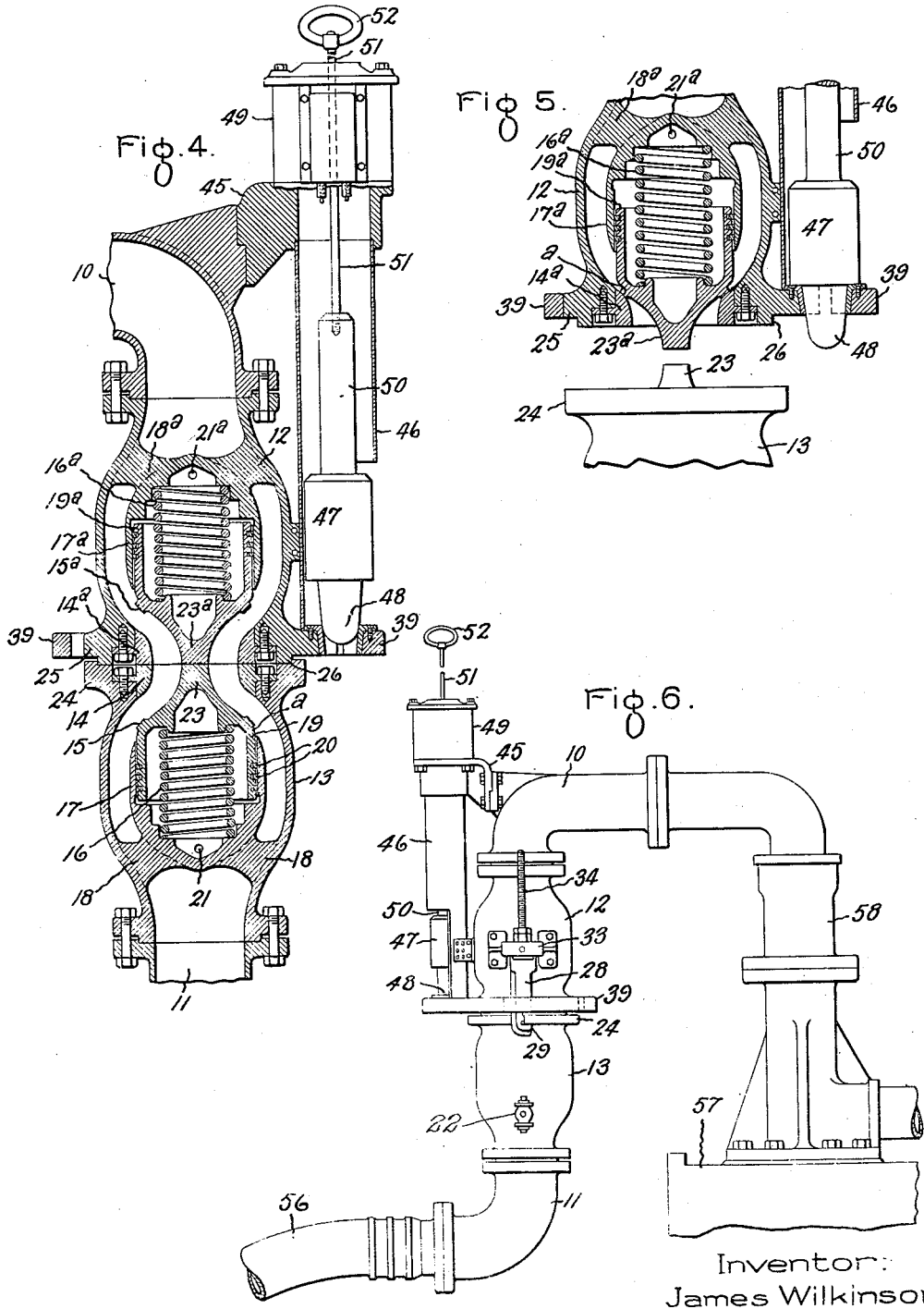

Patented May 6, 1924.

1,493,306

UNITED STATES PATENT OFFICE.

JAMES WILKINSON, OF SCHENECTADY, NEW YORK, ASSIGNOR TO GENERAL ELECTRIC COMPANY, A CORPORATION OF NEW YORK.

QUICK-RELEASE VALVE COUPLING.

Application filed March 17, 1921. Serial No. 452,931.

*To all whom it may concern:*

Be it known that I, JAMES WILKINSON, a citizen of the United States, residing at Schenectady, county of Schenectady, State of New York, have invented certain new and useful Improvements in Quick-Release Valve Couplings, of which the following is a specification.

The present invention relates to quick release valve couplings of the type wherein two pipe ends each containing valves for closing such ends are adapted to be connected together in a detachable manner so they can be quickly released, the valves being opened when the ends are connected together and closed automatically when disconnected and separated.

The object of my invention is to provide an improved structure and arrangement in an apparatus of this character, and for a consideration of what I believe to be novel and my invention, attention is directed to the accompanying description and the claims appended thereto.

In the drawing, Fig. 1 is a side elevation of adjacent pipe ends comprising a quick release valve coupling embodying my invention; Fig. 2 is a view taken at a right angle to Fig. 1 and partly broken away to illustrate certain structural features; Fig. 3 is a bottom plan view of the structure shown in Fig. 1; Fig. 4 is a longitudinal view of the same taken on line 4—4, Fig. 2; Fig. 5 is a detail view illustrating the separation of the pipe ends; Fig. 6 is a diagrammatic view showing an application of my invention; and Fig. 7 is a perspective view of certain parts.

Referring to the drawing, 10 and 11 indicate pipe lines, the ends of which terminate in casings 12 and 13 which are in substance combined valve and coupling casings. In casing 13 is a valve seat 14 against which a valve 15 is adapted to seat. Valve 15 is biased toward seat 14 by a spring 16 which at one end engages the valve and at the other end rests against the head of a cylinder 17 supported in casing 13 by a web 18. Formed integral with valve 15 is a sleeve 19 which slides in cylinder 17, suitable packing rings 20 being provided between the sleeve and cylinder. Cylinder 17 is connected by two openings 21 to atmosphere and in such openings are check valves 22, one of which opens outwardly and the other inwardly. Cylinder 17 and sleeve 19 form a dashpot to regulate the closing movement of valve 15. Valve 15 can be readily opened against the action of spring 16 by pushing on the valve to compress the spring, air trapped in the cylinder passing outwardly through one of the openings 21 and the outwardly opening check valve 22 which is set to pass air freely. When pressure on the valve is relieved spring 16 will force it toward the closed position and this movement will be cushioned by the piston moving in sleeve 19 acting as a dash pot. During the closing movement, the outwardly opening check valve 22 will be closed and the inwardly opening check valve 22 will be open, the latter being set to admit air at a rate to effect the desired retardation of the closing movement.

In casing 12 is a valve structure similar to that in casing 13 and the same reference numerals with the exponent "a" added have been applied to corresponding parts.

The valves 15 and 15ª are provided with extensions 23 and 23ª respectively which, when the valves are closed extend beyond the ends of the respective casings 13 and 12, as shown in Fig. 5. When the casings are placed with their ends together for the purpose of coupling the pipe lines to each other, ends 23 and 23ª engage each other with the result that the valves are opened as shown in Fig. 4. When thus opened, the pipe lines 10 and 11 are in communication with each other for the passage of fluid. Casing 13 is provided with an end flange 24 which engages with an end flange 25 on casing 12, flange 24 being provided with a recess within which a projection 26 on flange 25 fits in order to fix the casings against transverse movement relatively to each other. Flange 24 on opposite sides is provided with integral projections or ears 27 which are engaged by hooks 28 pivotally supported on opposite sides of casing 12.

The hooks are provided with noses 29 at their lower ends adapted to engage beneath projections or ears 27. At their upper ends hooks 28 are provided with furcations 30 which straddle blocks 31 provided with trunnions 32 by means of which the blocks are pivoted between U-shaped brackets 33 and the sides of casing 12. Connected to and forming in substance a part of hooks 28 are threaded rods 34, the lower ends of the rods being fastened in sockets in hooks 28 by means of pins 35. Rods 34 pass freely through openings 36 in blocks 31 and on their upper ends are threaded supporting nuts 37 and lock nuts 38. Hooks 28 are thus hung on blocks 31 by means of the nuts 37 and 38. By screwing nuts 37 and 38 back and forth the hooks can be lowered and raised and by a swinging movement they can be released from engagement with projections or ears 27.

The hooks are adapted to be released by a transversely sliding ring 39 which surrounds flange 25 and is provided with projections 40 and 41 which slide on suitable surfaces presented by flange 25 so as to support the ring and guide it in its transverse movements. Ring 39 is enlarged at the parts adjacent ears 27 and in such enlargements are holes 42 through which the lower ends of hooks 28 project, the holes being sufficiently large to permit the hooks to pass through them and engage projections or ears 27. Ring 39 is spaced from flange 25 as best shown in Fig. 3, so it may move transversely thereof to release hooks 28 from engagement with projections 27. Between ring 39 and flange 25 as shown at the left-hand side of Fig. 3 is formed an opening 43 which is partly in the flange and partly in the ring and is provided with a suitable wearing lining 44.

Fixed on the side of valve casing 12 by means of brackets 45 is a casing 46 which forms a guide for a sliding weight 47. The lower end of weight 47 is provided with a rounded nose 48 which is adapted to strike in opening 43 and effect a transverse movement of ring 39 relatively to flange 25. On the upper end of guide casing 46 is mounted a solenoid 49 having a core 50 which is connected to and forms a part of weight 47. To the upper end of core 50 is fixed a rod 51 having a handle 52 for lifting the weight. Connected to solenoid 50 is a circuit 53 in which is a suitable source of electrical energy 54 and a switch 55. The switch 55 may be located at any suitable point from which it is desired to control the release of the coupling. When the electric circuit is closed and weight 47 lifted, the solenoid serves to hold the weight in lifted position as shown in Figs. 1 and 2. When the circuit is opened the weight will be released and will fall, nose 48 striking in opening 43 as indicated in Figs. 4 and 5 so as to move ring 39 transversely of flange 25 and release hooks 28 from engagement with ears 27. In Fig. 4, nose 48 is shown as just entering opening 43 and in Fig. 5 it is shown as having passed into the opening and moved ring 39 to effect the release of the hooks.

Referring particularly to Figs. 4 and 5 it will be noted that valves 15 and 15$^a$ are so arranged and shaped that when they seat a certain inclined area as indicated at $a$ will be exposed to the pressure in conduits 10 and 11, which pressure acting in a direction normal to these inclined areas will tend to produce a component acting against the biasing action of the springs 16 and 16$^a$.

This component is determined for any given pressure by the angle at which this area is presented to the fluid pressure, together with the size of the area. In this case the angle and the surface area are of any convenient size to fit into a symmetrical and reasonable design and the springs 16 and 16$^a$ are built to provide sufficient biasing action to insure closing the valves against the resultant component produced by any normal pressure. When a valve is closed suddenly on a stream moving with any considerable velocity, the pressure will build up to excessive values, tending to produce the well known water hammer effect until the moving column of fluid is brought to rest. With incompressible fluids this pressure may become sufficient to cause the bursting of the valve or the pipe line. In the case of a pipe line carrying valuable or inflammable oil, such a result is to be avoided. In this device the pressure will never reach a dangerous value because as soon as the pressure component acting against springs 16 and 16$^a$ through areas $a$ reaches a value above normal, it will force the valves open and relieve the pressure before it becomes excessive.

One use to which my invention is well adapted is that of connecting a pipe line leading from shore to the filling pipe of an oil tanker ship. In connection with the loading of such a vessel with oil, the vessel is anchored off shore and a flexible pipe line which runs out from shore is connected to the filling conduit of the tank or tanks of the vessel. It sometimes happens as, for example, upon the coming up of a storm or in case of fire, that it is desirable to quickly release the coupling and move the vessel, and my improved coupling is well adapted for this use. Referring to Fig. 6, 56 indicates a flexible pipe line which may lead out from shore for conveying oil to vessels and 57 indicates the deck of a vessel on which is mounted a conduit 58 and through which tanks of the vessel are filled. Conduit 10 and valve casing 12 are attached directly to conduit 58, the valve casing 12 projecting downwardly over or adjacent the side of the vessel.

In the use of my invention, when it is desired to connect the pipe lines, nuts 38 and 37 are screwed back to permit hooks 28 to drop downwardly. The two casings 12 and 13 are then placed adjacent each other with projections 23 and 23ᵃ in engagement and the lower end of hooks 28 are passed through holes 42 and hooked underneath the projections or ears 27 on flange 24, the hooks having been screwed down sufficiently far to permit them to hook thereunder. Nuts 37 and 38 are then screwed down to pull the hooks upwardly, thus pulling casing 13 toward casing 12 and at the same time forcing valves 15 and 15ᵃ open against the action of springs 16 and 16ᵃ. The nuts are screwed down until the valves are fully opened and the valve casing flanges are in firm engagement so that leakage is prevented. At this time the electric circuit 53 is closed and weight 47 is held raised as shown in Figs. 1 and 2. The electric switch 55 may be located at a suitable point on the vessel or on shore, or if desired, there may be switches at both places, it being obvious that any number of switches desired may be provided, each one of which is adapted to open the circuit of the electro-magnet. Now in case it becomes desirable to quickly release the coupling it is only necessary to open the circuit whereupon the weight 47 will be released and upon dropping, its nose 48 will strike in opening 43 thus moving ring 39 transversely of flange 25 and knocking hooks 28 from under ears 27. The valve casings will then separate by gravity and springs 16 and 16ᵃ will force the valves toward their seats, the movement of the valves toward their seats being cushioned by the dashpot effect of sleeves 19 and 19ᵃ sliding in cylinders 17 and 17ᵃ. It will thus be seen that by this arrangement the coupling can be instantly released and the valves closed, the entire action being automatic.

To connect the coupling again, it is only necessary to close the circuit 53, lift the weight 47 by means of handle 52 and couple together the valve casing in the manner already described.

While I prefer to utilize an electrical arrangement for releasing weight 47, since this gives the greatest ease and flexibility of control, it will of course, be understood that my invention is not necessarily limited thereto and that other suitable releasable means may be employed for holding the weight in raised position.

The dashpot arrangement for cushioning the closing movement of the valves and the arrangement for preventing water hammer are of particular utility in apparatus of this character, especially if the pipe lines are comparatively large and a somewhat rapidly flowing liquid is being handled.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is,—

1. In combination, a pair of casings forming conduit ends and having abutting flanged openings registering to form a continuous conduit, a valve seat about each opening within the casing, a cylinder within each casing spaced from the walls thereof and from the opening and being coaxial with said opening, a sleeve fitting in each cylinder, means biasing said sleeve outwardly of the cylinder toward the opening, a valve carried at the outer end of the sleeve for engaging the valve seat, a portion of the end of said sleeve being located within the casing and subject to the longitudinal pressures there obtaining when the valve is closed whereby the valve may be opened to relieve excessive pressures by the pressure component acting thereon and a portion of the end of each sleeve extending outwardly of the casing through the opening to meet when the casings are drawn together and force the sleeves inwardly of the cylinder and the valves off their seats as the flanged openings come into registering engagement, means for drawing the casings together and means for releasing them to permit them to separate.

2. In a conduit coupling, the combination with a pair of casings having valve seats therein and valves for engaging said seats when the casings are separated, of axially-retractable transversely-pivoted hooks carried by one of said casings engaging with projections on the other, means for retracting the hooks to draw the casings into engagement, means for pivoting the hooks out of engagement with the projections to effect a quick release and a separation of the casings comprising a member movable transversely of the casings and lying in abutting engagement with said hooks, said member being carried by the flange of the one of said casings and being spaced therefrom to form an opening between them, a weighted wedge suspended above said opening and adapted when released to drop therein to move the member and release the hooks whereby the casings are released and permitted to separate, and means for releasing said weighted wedge when it is desired to cause a separation of the casings.

3. In combination, a pair of casings having valve seats therein, valves for engaging said seats, means for coupling said valve casings together, said valves being held open when the casings are coupled together, and means including a suspended weight adapted to release said coupling means when the weight drops.

4. In combination, a pair of casings having valve seats therein, valves for engaging said seats, means for coupling said valve casings together, said valves being held open when the casings are coupled together, a member carried by and movable relatively to the casings for releasing said coupling means, and a suspended weight which when permitted to fall strikes said releasing member to cause it to release the coupling means.

5. In combination, a pair of casings having valve seats therein, valves for engaging said seats, hooks pivotally mounted on one of said casings, projections on the other casing with which the hooks engage to couple the casings together, said valves being held open when the casings are coupled together, and a movable member normally held under restraint and movable when released to effect a disengagement of said hooks from the projections whereby the casings may separate.

6. In combination, a pair of casings having valve seats therein, valves for engaging said seats, hooks pivotally mounted on one of said casings, projections on the other casing with which the hooks engage to couple the casings together, said valves being held open when the casings are coupled together, a member movable transversely of the valve casings for releasing said hooks from engagement with the projections, and a weight suspended above the transversely movable member and adapted when released to drop and strike it to move such member to effect the release of the hooks.

7. In combination, a pair of casings having valve seats therein, valves for engaging said seats, hooks pivotally mounted on one of said casings, projections on the other casing with which the hooks engage to couple the casings together, said valves being held open when the casings are coupled together, means including a member normally held under restraint and adapted to be released to disengage said hooks from the projections so the valve casings can separate, electromagnetic means for holding said member under restraint, and an electric circuit controlling said electromagnetic means.

8. In a conduit coupling having abutting flanged casings forming conduit ends and having opposed openings through which the casings are joined to form a continuous conduit, the combination of a valve means carried within each casing comprising a valve seat about the opening in the casing, a cylinder spaced from the casing walls and from the opening and lying coaxial with said opening, a piston fitting into said cylinder, means biasing said piston outwardly of said cylinder and toward the opening, a valve carried at the outer end of the piston for engaging the valve seat and abutting projections carried by the pistons provided to engage one with the other when the coupling is made whereby the pistons are forced into the cylinders and the valves opened, and means carried exteriorly of the casings for releasably coupling the casings together comprising hooks carried by one of the casings and engaging with projections on the other, said hooks being retractable longitudinally to draw the casings together and pivotally mounted to swing transversely of the casings to disengage the projections, a member abutting said hooks and movable transversely of the casings for releasing said hooks from engagement with the coupling projections, said member and the casing flange by which it is carried being jointly recessed to form an opening axially parallel with the casings, a weighted wedge suspended above the opening and adapted when released to drop therein to move the member and thereby effect the release of the hooks, and means for releasing the weighted wedge when it is desired to release said hooks to effect a separation of the casings and a closing of the valves.

9. In combination, a pair of casings having valve seats therein, valves for engaging said seats, means for coupling said valve casings together, said valves being held open when the casings are coupled together, and means for releasing said coupling means to permit the casings to separate and the valves to close, said valves when closed presenting areas which are subject to the pressure in the casing whereby in case of excess pressure such as may be occasioned by "water hammer," the valves may be automatically opened to relieve it.

10. In combination, a pair of casings having valve seats therein, valves for engaging said seats, means for coupling said valve casings together, said valves being held open when the casings are coupled together, means biasing said valves toward closed positions, dashpot means for cushioning the closing movements of said valves, and means for releasing said coupling means to permit the casings to separate and the valves to close, said valves when closed preventing areas which are subjected to the pressure in the casing whereby in case of excess pressure such as may be occasioned by "water hammer," the valves may be automatically opened to relieve it.

11. In combination, a pair of valve casings having valve seats, valves in the casings, means biasing the valves to closed positions, dashpots for cushioning closing movements of said valves, said valves when closed presenting areas which are subjected to the pressures in the casing whereby the valves will be opened against the action of said biasing means in case of excess pressures in the casings, blocks pivotally mounted on one of said casings, hooks suspended from said blocks, threaded means for raising and lowering said hooks, a member slidably mounted on such casing and adapted to engage the hooks to swing them on their pivots, projections carried by the other casing with which the hooks engage to couple the casings together, said hooks being adapted to be released from engagement with said projections by said slidably mounted member, and means for effecting a movement of said slidably mounted member to release the hooks.

In witness whereof, I have hereunto set my hand this 16th day of March, 1921.

JAMES WILKINSON.